(12) United States Patent
Shimotakahara et al.

(10) Patent No.: US 8,977,096 B2
(45) Date of Patent: Mar. 10, 2015

(54) OPTICAL FIBERS

(75) Inventors: Iwao Shimotakahara, Tokyo (JP);
Ryuichi Sugizaki, Tokyo (JP); Takeshi Yagi, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 978 days.

(21) Appl. No.: 12/768,095

(22) Filed: Apr. 27, 2010

(65) Prior Publication Data

US 2010/0296786 A1 Nov. 25, 2010

(30) Foreign Application Priority Data

May 19, 2009 (JP) ................................. 2009-120546

(51) Int. Cl.
*G02B 6/036* (2006.01)
*G02B 6/02* (2006.01)

(52) U.S. Cl.
CPC ........ *G02B 6/02347* (2013.01); *G02B 6/02019* (2013.01)
USPC .......................................... 385/127; 385/126

(58) Field of Classification Search
USPC ................................... 385/123–128
See application file for complete search history.

(56) References Cited

U.S. PATENT DOCUMENTS

| 6,466,721 | B1 * | 10/2002 | Tsukitani et al. | 385/127 |
| 2009/0317041 | A1 * | 12/2009 | Goto | 385/126 |
| 2010/0215329 | A1 * | 8/2010 | Bickham et al. | 385/123 |
| 2010/0296786 | A1 | 11/2010 | Shimotakahara et al. | |

FOREIGN PATENT DOCUMENTS

| JP | 2003-084161 | 3/2003 |
| JP | 2004-226540 | 8/2004 |
| JP | 2007-108642 | 4/2007 |
| WO | 2004-092794 A1 | 10/2004 |
| WO | 2006/098471 A1 | 9/2006 |

OTHER PUBLICATIONS

U.S. Appl. No. 12/938,104, filed Nov. 2, 2010, Takahashi, et al.
Japanese Office Action (2009-120546) dated Oct. 2, 2012 (w/English translation).

* cited by examiner

*Primary Examiner* — Hemang Sanghavi
(74) *Attorney, Agent, or Firm* — Oblon, McClelland, Maier & Neustadt, L.L.P.

(57) ABSTRACT

An optical fiber suitable for high-capacity transmission having a large effective core area, a low bending loss, and capable of single mode operation at 1550 nm is provided. The optical fiber 10 has an effective core area ≥175 μm² at 1550 nm, a bending loss ≤10 dB/m at a bending diameter of 20 mm at 1550 nm, and a cut-off wavelength $\lambda_c \leq 1550$ nm. The optical fiber has a first core 11 at the center, which has a refractive index higher than that of the cladding 13; and a second core 12 around the first core 11, which has a refractive index lower than that of the cladding 13; a primary medium portion; and secondary medium portions, which have a refractive index lower than that of the primary medium portion and the secondary medium portions have a plurality of first secondary medium portions 15 around the first core 11 and a plurality of second secondary medium portions 16 around the first core 11 and outside of the first secondary medium portions 15.

6 Claims, 5 Drawing Sheets

OPTICAL FIBERS

CROSS-REFERENCES TO RELATED APPLICATIONS

This application claims the benefit of priority from Japanese Patent Application No. 2009-120546 filed May 19, 2009, the entire contents of which are incorporated herein by reference.

TECHNICAL FIELD

The present invention relates to optical fibers for high-capacity optical transmission.

BACKGROUND OF THE INVENTION

As the amount of data for transmission increases, long-distance high-capacity optical transmission using optical amplification technology is being considered. When wavelength-division multiplexing (WDM) is used for high-capacity optical transmission, non-linear effects in the optical fiber transmission line contribute to degradation in transmission characteristics. The non-linear effect of an optical fiber is proportional to $n_2/A_{eff}$ where $n_2$ is the non-linear refractive index and $A_{eff}$ is the effective core area. Therefore, the non-linear effect of an optical fiber can be decreased by increasing its effective core area.

In the past, the effective core area has been increased by optimizing the refractive index profile of the optical fiber. For example, in U.S. Pat. No. 6,466,721, optical fibers having effective core areas of approximately 80~120 $\mu m^2$ at 1550 nm have been disclosed.

However, if the effective core area is increased by optimizing the refractive index profile of the optical fiber, a "confinement" effect of the light transmitted in the optical fiber reduces in the core, and tends to degrade its bending-loss characteristic. Therefore, feasible effective core areas are limited to ranges which can preserve allowable bending-loss characteristics. For example, an allowable bending-loss characteristic can be 10 dB/m or less at a bending diameter of 20 mm to sustain cable manufacturing. Furthermore, if the confinement effect in the core is decreased due to the increase in effective core area, then the microbending loss is also increased. To overcome these issues, M. Tsukitani et al. discloses an optical fiber having a larger outer diameter, which achieves an effective core area of approximately 200 $\mu m^2$ at 1550 nm, in "Ultra low nonlinearity fiber with improved microbending performance"—OECC2002 Technical Digest, 11D1-3. However, optical fibers in U.S. Pat. No. 6,466,721 do not have large enough effective core areas for long-distance, high-capacity optical transmission required in recent years. In addition, even though M. Tsukitani et al. discloses an optical fiber with an effective core area of approximately 200 $\mu m^2$ at 1550 nm, either the bending loss at a bending diameter of 20 mm is extremely large (290 dB/m at 1550 nm) or the cut-off wavelength is shifted to a longer wavelength (i.e., 2000 nm). Furthermore, if the cut-off wavelength is shifted to 2000 nm, then it is impossible to have single-mode transmission at 1550 nm where transmission loss is the minimum for silica optical fibers.

SUMMARY OF THE INVENTION

The present invention discloses an optical fiber having a large effective core area and suitable bending loss for high-capacity, single-mode transmission at 1550 nm.

To solve the problem stated above, an optical fiber according to the present invention comprises a silica glass fiber having a core, a cladding around the core, and a resin coating around the cladding. The optical fiber has an effective core area $\geq 175$ $\mu m^2$ at 1550 nm, a bending loss $\leq 10$ dB/m around a 20 mm diameter bending at 1550 nm, and a cut-off wavelength $\lambda_c \leq 1550$ nm.

BRIEF DESCRIPTION OF THE DRAWINGS

Referring now to the drawings.

DETAIL DESCRIPTION

Embodiments of optical fibers and optical transmission systems related to the present invention are explained in detail by referring to the Figures. The embodiments do not limit the scope of the invention. In this specification, bending loss means bending loss at a bending diameter of 20 mm. Also, cut-off wavelength is the fiber cut-off wavelength $\lambda_c$, as defined in the International Telecommunication Union Telecommunication Standardization Sector (ITU-T) G. 650.1. Other terminologies not defined in the specification follow the definitions and measuring methods defined in ITU-T G.650.1 and G.650.2.

(First Embodiment)

Figure 1:
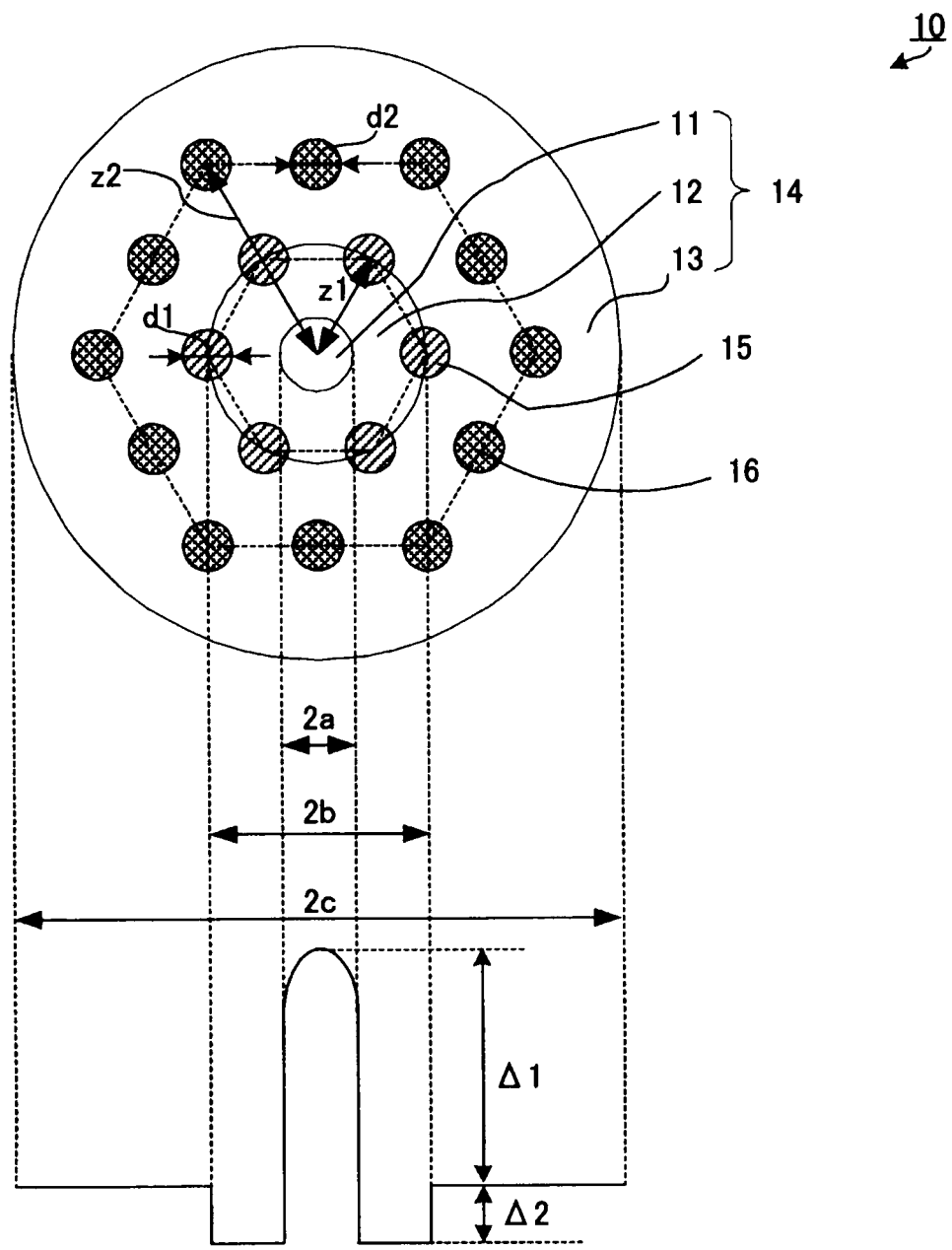
FIG. 1 is a schematic cross-sectional view of an optical fiber, which is related to a first embodiment of the present invention.

FIG. 1 shows a schematic cross-sectional view of an optical fiber and a refractive index profile, which is related to a first embodiment of the present invention. As shown in FIG. 1, optical fiber 10 comprises a glass optical fiber 14 and a coating layer (not shown) around the glass optical fiber 14, where the glass optical fiber 14 has a first core 11 at the center, a second core 12 around the first core 11, and a cladding 13 around the second core 12. The first core 11 is doped with germanium (Ge) to increase the refractive index (i.e., the refractive index of the first core 11 is higher than that of the cladding 13). Also, the second core 12 is doped with fluorine (F) to reduce the refractive index (i.e., the refractive index of the second core 12 is lower than that of the cladding 13). The cladding 13 is made from pure silica glass, which does not contain any dopants to change its refractive index. Furthermore, the cladding may be doped with Ge (to increase its refractive index) or F (to decrease its refractive index). The coating layer is made from an ultraviolet (UV) curable resin. As shown in FIG. 1, for example, $\Delta_1$=0.06~0.14%, $\Delta_2$=−0.20~0.05% and ratio $2b/2a$=3.0~4.5; where $\Delta_1$ is relative refractive index difference between the first core 11 and the cladding 13, $\Delta_2$ is relative refractive index difference between the second core 12 and the cladding 13, $2a$ is the diameter of the first core 11, and $2b$ is the outer diameter of the second core 12.

$\Delta_1$ and $\Delta_2$ can be defined in the following equations:

$$\Delta_1 = [(n_1 - n_c)] \times 100 \quad (1)$$

$$\Delta_2 = [(n_2 - n_c)/n_c] \times 100 \quad (2)$$

Where $n_1$ is the maximum refractive index of the first core 11, $n_2$ is the minimum refractive index of the second core 12, and $n_c$ is the refractive index of the cladding 13.

In one example, the diameter $2a$ of the first core 11 is 10~20 μm and the outer diameter $2c$ of the cladding 13 is 120~130 μm. The diameter, $2a$, of the first core 11 is defined as the diameter where its relative refractive index difference is half of $\Delta_1$ in the boundary region between the first core 11 and the second core 12. Because the outer diameter, $2c$, (equivalent to the outer diameter of the glass optical fiber 14) of the cladding 13 of optical fiber 10 is approximately 125 μm (the most common cladding diameter for optical fibers), it is easy to connect with, for example, a conventional optical fiber, which has its zero-dispersion wavelength at 1300 nm. Also, when a technician handles the optical fiber during installation or during splicing, the optical fiber 10 can be treated as a regular optical fiber.

The glass optical fiber 14 has a primary medium portion and a secondary medium portion where the refractive index of the secondary medium portion is lower than that of the primary medium portion and the cross-section of the secondary medium is circular. The secondary medium portion has plurality of first secondary medium portions 15 around the first core 11 and plurality of second secondary medium portions 16 outside of the first secondary medium portions 15 and around the first core 11. The first secondary medium portions 15 and the second secondary medium portions 16 are made from medium, which has lower refractive index than the primary medium portion, for example, liquid, gas (e.g., air) or solid filled inside of holes made within the glass optical fiber 14. Preferably, the first secondary medium portion 15 and the second secondary medium 16 comprise air (e.g., hole) from the viewpoint of manufacturability.

Six first secondary medium portions 15 are positioned around the first core 11 every 60 degrees with respect to the center of the core, and are equidistant from its center. Therefore, those first secondary medium regions 15 are placed to have a six-fold rotational symmetry with respect to the first core 11. For instance, $z_1/a$=3.0~4.5 where $2a$ is the diameter of the first core 11 and $z_1$ is the distance between the center of the first core 11 and the center of each first secondary medium portion 15. $z_1$ is defined as an average distance between the center of the first core 11 and the center of the first secondary medium portions 15. The centers of the first secondary medium portions 15 are positioned near the boundary region between the second core 12 and the cladding 13, and a portion of the first secondary medium regions 15 overlap with the boundary between the second core 12 and the cladding 13.

Twelve second secondary medium portions 16 are positioned around the first core 11 and outside of the first secondary medium portion 15. Furthermore, the twelve second secondary medium portions 16 are positioned such that apexes (selected second secondary medium portions) on the extension lines of the center of the first core 11 and the center of the first secondary medium 15 make six-fold rotational symmetry with respect to the center of the first core 11. Therefore, the glass optical fiber 14 has total of 18 secondary medium portions. The distance $z_2$ between the first core 11 and each of the second secondary medium portions 16 on the apex of a hexagon is twice as long as the distance $z_1$ between the first core 11 and each of the first secondary medium 15. The distance $z_2$ between the first core 11 and each of the second secondary portions 16 is defined as the average distance between the center of the first core 11 and the center of the second secondary medium portions 16 on the apex of a hexagon. If the diameters $d_1$ of the first secondary medium portion 15 and the diameters $d_2$ of the second secondary medium portion 16 were the same, for example, then the diameters d of the diameters of the first secondary medium portion 15 and the second secondary medium portion 16 would be between 8~13 μm.

It is possible to have a cut-off wavelength of 1550 nm or shorter, an effective core area ≥175 μm$^2$, and a bending loss ≤10 dB/m at a bending diameter of 20 mm if the core had the first core 11 at the center of the core and the second core 12 surround the first core 11 (so called W-type profile) wherein the first core 11 has higher refractive index than that of the cladding 13, the second core 12 has a lower refractive index than that of the cladding 13; and the glass optical fiber has the primary medium portions and the secondary medium portions wherein the second secondary medium portions have a lower refractive index than the primary medium portions, and the secondary medium portions have a plurality of the first secondary medium portions around the first core 11 and a plurality of second secondary medium portions around the first core 11 and outside of the first secondary medium portions.

Because the optical fiber 10 has low bending loss, it has low macrobending loss—even if the optical fiber is bent during installation. Furthermore, because the optical fiber has the large effective core area, it has low non-linearity and is capable of high-capacity transmission. Because the optical fiber has the cut-off wavelength of 1550 nm or shorter, it is capable of single-mode operation in the broad band including C band and the L band.

(Second Embodiment)

Figure 2:
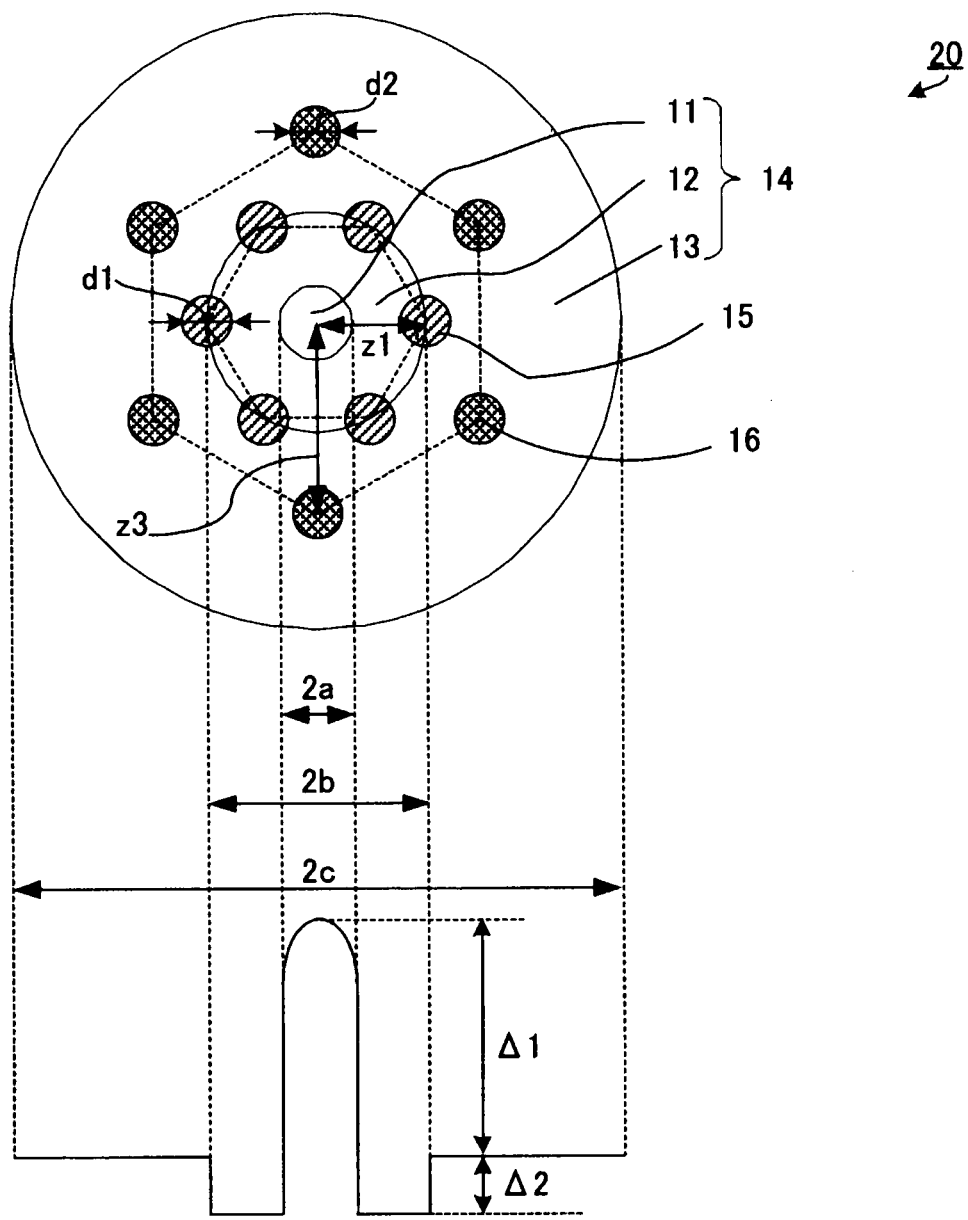
FIG. 2 is a schematic cross-sectional view of an optical fiber, which is related to a second embodiment of the present invention.

FIG. 2 shows a schematic cross-sectional view of an optical fiber and a refractive index profile, which is related to a second embodiment of the present invention. As shown in FIG. 2, the optical fiber 1 is the same fiber disclosed in the first embodiment except for the positions of the second secondary medium portions 16.

Six second secondary medium portions 16 are placed around the first core 11 outside of the first secondary medium portions 11. Furthermore, the six second secondary medium portions 16 are positioned such that midpoints of the adjacent second secondary medium portions 16 are on the extension lines of the center of the first core 11 and the center of the first secondary medium portions 15 and have six-fold rotational symmetry with respect to the center of the first core 11. Therefore, the glass optical fiber 14 has a total of 12 secondary medium portions. The distance $z_3$ between the center of the first core 11 and the center of each second secondary medium portion 16 is, for example, $\sqrt{3}$ longer than the distance $z_1$ between the first core 11 and each first secondary medium portion 15. The distance $z_3$ between the center of the first core 11 and each second secondary medium portion 16 is defined as the average distance between the center of the first core 11 and the center of each second secondary medium portion 16. If the diameter, $d_1$, of the first secondary medium portions 15 and the diameter, $d_2$, of the second secondary medium portions 16 is the same, for example, then the diameter, d of the diameters of the first secondary medium portion 15 and the second secondary medium portion 16, is between 10.5~13 μm.

The optical fiber 20 of the second embodiment can have a cut-off wavelength ≤1550 nm, an effective core area ≥175 μm², and a bending loss ≤10 dB/m at a bending diameter of 20 mm. Because the optical fiber 10 has low bending loss, it has low macrobending loss—even if the optical fiber is bent during installation. Furthermore, because the optical fiber has the large effective core area, it has low non-linearity and is capable of high-capacity transmission. Because the optical fiber has the cut-off wavelength of 1550 nm or shorter, it is capable of single-mode operation in the broad band including C band and the L band.

Below, the first and second embodiments of the present invention are explained in detail using the results of simulation calculations. First, a refractive index profile is researched to create an effective core area ≥175 μm² without any secondary medium portions (i.e., without the first and second secondary medium portions 15, 16 in FIGS. 1 and 2).

Figure 3:
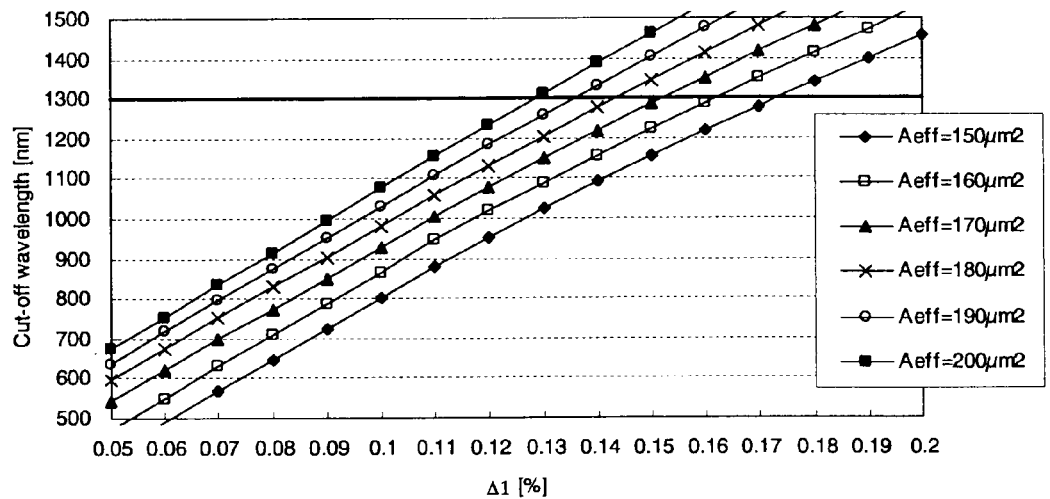
FIG. 3 is a chart, which shows relationships among $\Delta_1$, $A_{eff}$ and cut-off wavelength, where $\Delta_1$ is relative refractive index difference between a first core 11 and a cladding 13 in an optical fiber without secondary medium portions.

FIG. 3 is a chart, which shows relationships among relative refractive index differences $\Delta_1$ of the first core 11 with respect to the cladding 13, $A_{eff}$ and cut-off wavelength without any secondary medium portions. The relative refractive index difference $\Delta_2$ of the second core 12 with respect to the cladding 13 is −0.10% and the ratio $2b/2a$ of the diameter, $2a$, of the first core 11 and the outer diameter $2b$ of the second core 12 is 3.0. The diameter, $2a$, of the first core 11 is controlled to obtain preferred $A_{eff}$ value of 175 μm².

As shown in FIG. 3, as $\Delta_1$ and $A_{eff}$ increase, cut-off wavelength becomes longer. Also, because the first secondary medium portions 15 and the second secondary medium portions 16 tend to make the cut-off wavelength longer, in order to keep the cut-off wavelength ≤1550 nm with the first and second secondary medium portions 15, 16 it is preferable to keep the cut-off wavelength ≤1350 nm without the first and second secondary medium portions 15, 16. From FIG. 3, if $A_{eff}$≥175 μm² and the cut-off wavelength ≤1350 nm, then $\Delta_1$≤0.14%. Therefore, $\Delta_1$≤0.14% preferably.

If the relative refractive index difference $\Delta_2$ of the second core 12 with respect to the cladding 13 is ≥−0.05%, then the benefits of a W-type profile are reduced, and therefore it is difficult to increase the $A_{eff}$ to ≥175 μm². Also, if $\Delta_2$≤−0.20%, then the amount of F used to reduce the refractive index increases, which increase manufacturing cost and increase transmission loss. Therefore, $\Delta_2$ is preferably within the −0.20~−0.05% range.

Also, if the ratio $2b/2a$ between the diameter, $2a$, of the first core 11 and the outer diameter, $2b$, of the second core 12 is 3.0 or less, then the benefits of a W-type profile are reduced, and therefore it is difficult to increase the $A_{eff}$ to ≥175 μm². Also, if $2b/2a$≥4.5, then it does not have much effect in increasing $A_{eff}$ and the amount of F needed increases, which increases the manufacturing cost and the transmission loss. Therefore, $2b/2a$ is preferably between 3.0~4.5.

Next, as shown in the first and second embodiments of the present invention, effects of the first and second secondary medium portions 15, 16 are explained. The structure similar to the first embodiment is called an 18-hole structure and the structure similar to the second embodiment is called a 12-hole structure.

In the first and second embodiments, the ratios of $z_1/a$ between the diameter $2a$ of the first core 11 and the distances $z_1$ between the center of the first core 11 and the center of the first secondary medium portions 15 are 3.0~4.5. If the first secondary medium portions 15 are too close to the first core 11, then the cut-off wavelength becomes long because confinement effect of not only fundamental mode but also higher-order-mode of the transmitted light increase. Also, it tends to reduce the $A_{eff}$. On the other hand, if the first secondary medium portions 15 are too far away from the first core 11, then it tends to have large bending loss. Therefore, in order to reduce the bending loss and to increase the $A_{eff}$ at the same time, $z_1/a$ is preferably between 3.0~4.5. If $z_1/a$ is within this range and if $A_{eff}$≥175 μm², then a bending loss of 10 dB/m or less and a cut-off wavelength ≤1550 nm can be achieved.

Figure 4:
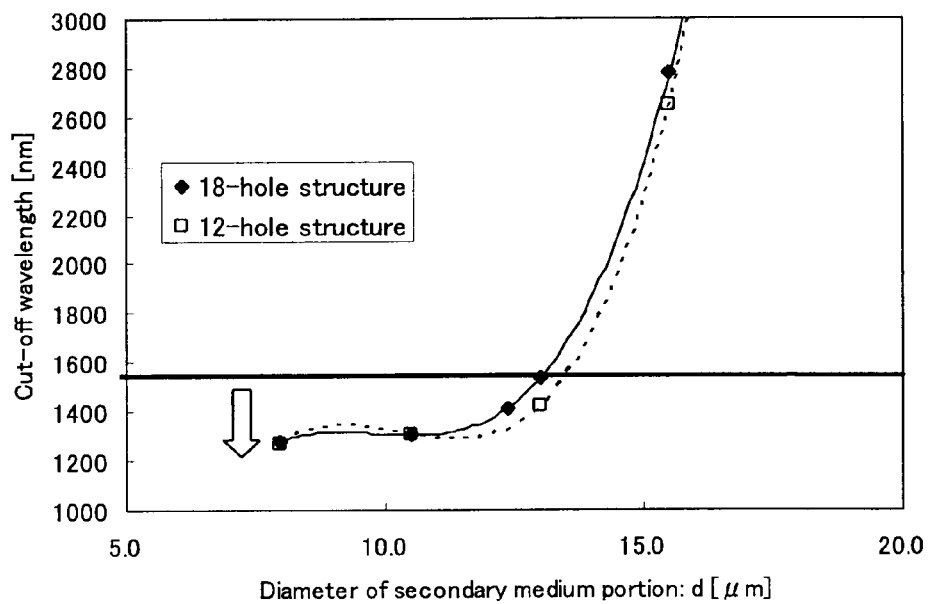
FIG. 4 is a chart, which shows the relationship between the diameter, d, and the cut-off wavelength, wherein the diameter, d, is the diameter of the secondary medium portion of the optical fiber in the embodiments of the present invention.

Next, FIG. 4 shows the relationship between diameter, d, of the secondary medium portions and cut-off wavelength for the 18-hole structure shown in FIG. 1 and the 12-hole structure shown in FIG. 2, wherein the diameter d is the same as diameters d1, d2 of the first and second secondary medium portions 15, 16 (i.e., d1=d2=d). $\Delta_1$=0.14%, $\Delta_2$=−0.10%, $2b/2a$=3.0 and $z_1/a$=3.0. In the 18-hole structure, distance $z_2$ between the center of the first core 11 and the center of each second secondary medium portion 16 on the apex of a hexagon is twice as long as the distance $z_1$. In the 12-hole structure, distance $z_3$ between the center of the first core and the center of each secondary second medium portion 16 is $\sqrt{3}$ as long as the distance $z_1$. The diameter, $2a$, of the first core 11 is controlled to obtain $A_{eff}$≥180 μm².

According to FIG. 4, in both the 18-hole structure and the 12-hole structure, if the diameter, d, of the secondary medium portion is ≤13 μm, then the cut-off wavelength ≤1550 nm. Also, because the cut-off wavelength tends to become shorter as $\Delta_1$ is decreased, if $\Delta_1$ is smaller than 0.14% (e.g., as in FIG. 4), then the cut-off wavelength becomes even shorter. If $\Delta_2$ is within −0.20~−0.05%, then there is very little difference in the cut-off wavelength. Also, as $z_1/a$ becomes larger (i.e., as the first secondary medium portions 15 are further away from the center of the first core 11), the cut-off wavelength tends to become shorter. If $z_1/a$≥3.0 (e.g., as in FIG. 4), then the cut-off wavelength becomes even shorter. Therefore, if $\Delta_1$≥0.14%; $2b/2a$≥3.0; $z1/a$≥3.0; the diameter of the first secondary medium portions 15 and the second secondary medium portions 16 is the same; and the diameter ≤13 μm; then the cut-off wavelength can be ≤1550 nm and single-mode operation is possible in the wavelengths of 1550 nm or shorter.

Figure 5:
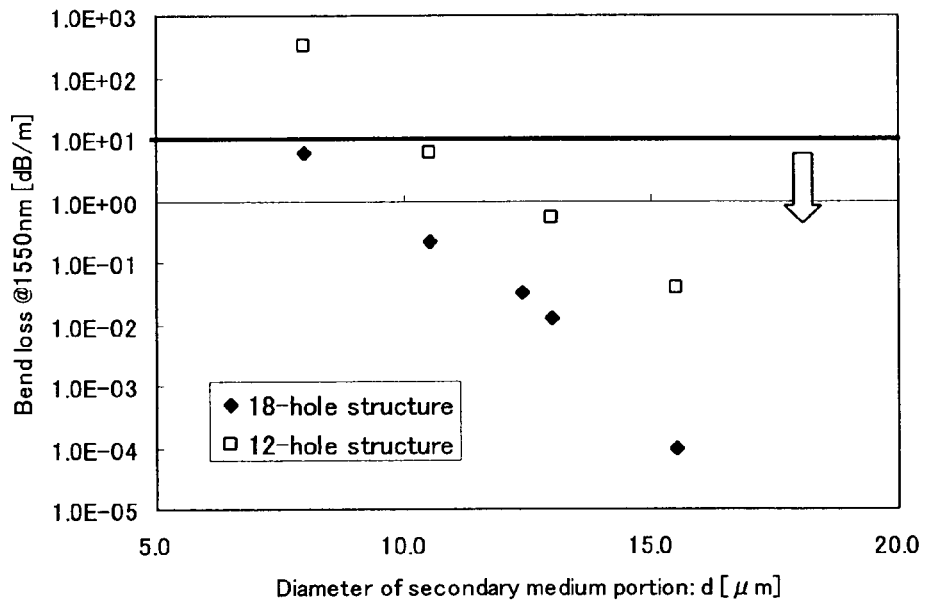
FIG. 5 is a chart, which shows the relationship between the diameter d and bending loss.

In a similar manner, FIG. 5 shows the relationship between diameter, d, of the secondary medium portions and bending loss at a bending diameter of 20 mm at 1550 nm, wherein the diameter, d, is the same as diameters d1, d2 of the first and second secondary medium portions 15, 16 (i.e., d1=d2=d). $\Delta_1$=0.06%, $\Delta_2$=−0.10%, $2b/2a$=4.5 and $z_1/a$=4.5. In the 18-hole structure, distance $z_2$ between the center of the first core 11 and the center of each of the second secondary medium portions 16 on the apex of a hexagon is twice as long as the distance $z_1$; in the 12-hole structure, distance $z_3$ between the center of the first core and the center of each of the secondary second medium portions 16 is $\sqrt{3}$ as long as the distance $z_1$. The diameter, $2a$, of the first core 11 is controlled to obtain $A_{eff}$≥180 μm².

According to FIG. 5, in the 18-hole structure, if the diameter d of the secondary medium portion is ≥8 μm, then the bending loss is ≤10 dB/m; and in 12-hole structure, if the diameter, d, of each of the secondary medium portions is ≥10.5 μm, then the bending loss is less than 10 dB/m. Also, because bending loss tends to become smaller as $\Delta_1$ increases, if $\Delta_1$ is larger than 0.06% (e.g., as in FIG. 5), then bending loss becomes lower than the value shown in FIG. 5. If $\Delta_2$ is within $-0.20 \sim -0.05\%$, then there is very little difference in bending loss. Also, if $2b/2a$ is within $3.0 \sim 4.5$, then there is very little difference in bending loss. As $z_1/a$ becomes smaller (i.e., as the first secondary medium portions 15 get close to the center of the first core 11), bending loss tends to become smaller. If $z_1/a \leq 4.5$ (e.g., as in FIG. 5), then bending loss becomes lower than the value shown in FIG. 5. Therefore, if $\Delta_1 \geq 0.06\%$; $2b/2a \leq 4.5$; $z_1/a \leq 4.5$; the diameters of the first secondary medium portions 15 and the second secondary medium portions 16 are the same; the diameter is $\geq 8$ μm for the 18-hole structure and the diameter is $\geq 10.5$ μm for the 12-hole structure; then the bending loss can be $\leq 10$ dB/m.

From above discussion, in order to satisfy predetermined cut-off wavelength, predetermined bending loss, and manufacturability; it is preferable to have $\Delta_1 = 0.06 \sim 0.14\%$, $\Delta_2 = -0.20 \sim -0.05\%$, $2b/2a = 3.0 \sim 4.5$, $z_1/a = 3.0 \sim 4.5$, the diameter of secondary medium portions=8~13 μm for the 18-hole structure and the diameter of secondary medium portions=10.5~13 μm for the 12-hole structure.

In the above embodiments, the diameters $d_1$ of the first secondary medium portions 15 and the diameters, $d_2$, of the second secondary medium portions 16 are the same. However, $d_1$ and $d_2$ do not have to be the same diameter in order to satisfy both predetermined cut-off wavelength and predetermined bending loss. Also, in the above embodiments, the second secondary medium portions 16 are placed in the positions where $z_2$ is twice as long as $z_1$ for the 18-hole structure and the positions where $z_3$ is $\sqrt{3}$ as long as $z_1$ for the 12-hole structure. However, both predetermined cut-off wavelength and predetermined bending loss can be satisfied with other positions.

Figure 6:
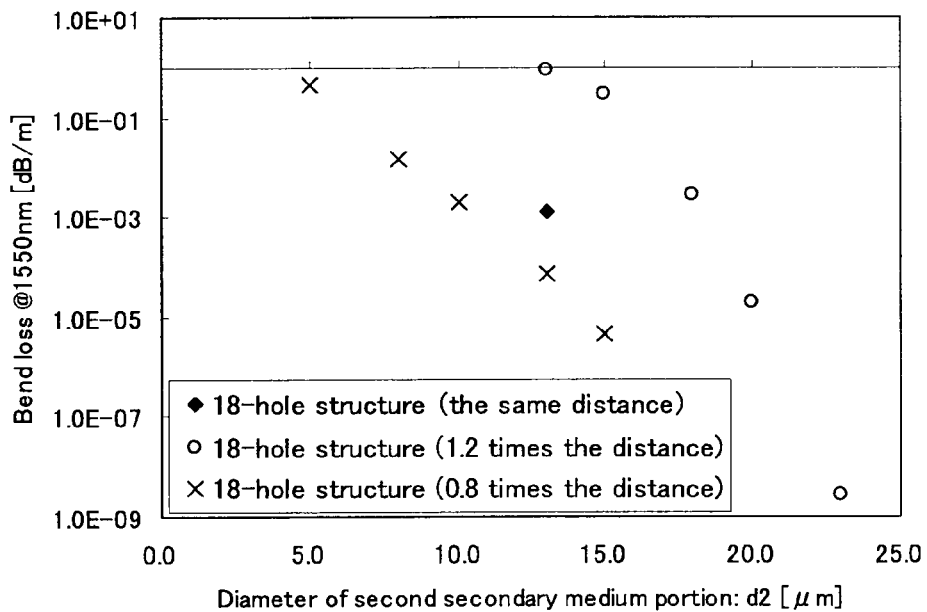
FIG. 6 is a chart, which shows the relationship between the diameter $d_2$ and bending loss when position $z_2$ and the diameter, $d_2$, are changed, wherein the diameter, $d_2$, is the diameter of the second secondary medium portion of the optical fiber in the first embodiment of the present invention and the position $z_2$ is the position of the second secondary medium portion.
Figure 7:
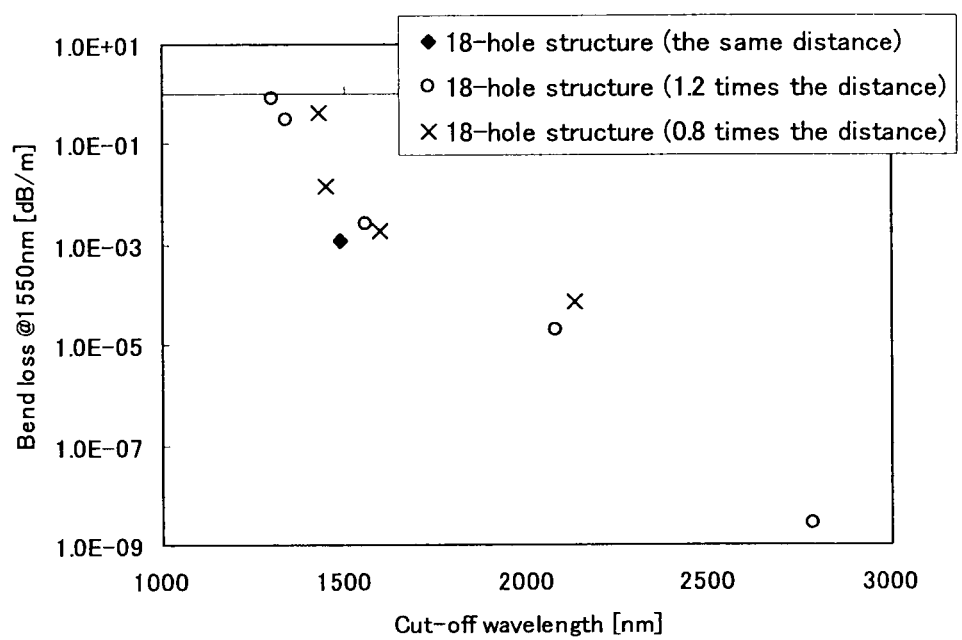
FIG. 7 is a chart, which shows the relationship between cut-off wavelength and bending loss when position $z_2$ and diameter, $d_2$, are changed, wherein the diameter, $d_2$, is the diameter of the second secondary medium portion of the optical fiber in the first embodiment of the present invention.

As an example, FIG. 6 shows the relationship between diameter, $d_2$, of the second secondary medium portion and bending loss when the second secondary medium portions are close or far to the first secondary medium portions in the 18-hole structure. FIG. 7 shows the relationship between cut-off wavelength and bending loss when the second secondary medium portions are close or far to the first secondary medium portions in the 18-hole structure. $\Delta_1 = 0.10\%$, $\Delta_2 = -0.10\%$, $2b/2a = 3.5$, $z_1/a = 3.5$, the diameters, $d_1$, of the first secondary medium portions are 13 μm and the diameter, $2a$, of the first core 11 is controlled to obtain $A_{eff} = 180$ μm². Also, in FIGS. 6, 7, "18-hole structure (the same distance)" means structures shown as a reference where the distance $z_2$ between the first core 11 and each second secondary medium portion 16 on the apex of a hexagon is twice as long as the distance $z_1$ between the first core 11 and each first secondary medium portion 15; "18-hole structure (1.2 times the distance)" means structures where the distance $z_2$ between the first core 11 and each second secondary medium portion 16 on the apex of a hexagon is 2.4 times (1.2×2) as long as the distance $z_1$ between the first core 11 and each first secondary medium portion 15; and "18-hole structure (0.8 times the distance)" means structures where the distance $z_2$ between the first core 11 and each second secondary medium portion 16 on the apex of a hexagon is 1.6 times (0.8×2) as long as the distance $z_1$ between the first core 11 and each first secondary medium portion 15.

According to FIG. 6, in structures in which $z_2$ is 2.4 times as long as $z_1$, if the diameter $d_2$ of the second secondary medium portions 16 is approximately 18 μm, then the structure has approximately the same bending loss as the optical fiber with a structure where $z_2$ is twice as long as $z_1$ and $d_1$ and $d_2$ are 13 μm. Also, in structures where $z_2$ is 1.6 times as long as $z_1$, if the diameter $d_2$ of the second secondary medium portions 16 is approximately 10 μm, the structure has approximately the same bending loss as the optical fiber with a structure in which $z_2$ is twice as long as $z_1$ and $d_1$ and $d_2$ are 13 μm. Furthermore, according to FIG. 7, the relationship between the cut-off wavelength and bending loss is not changed with different structures. Therefore, by controlling the diameters, $d_2$, of the second secondary medium portions 16 in the 18-hole structure (1.2 times the distance) and in the 18-hole structure (0.8 times the distance); the predetermined cut-off wavelength, bending loss and $A_{eff}$ can be achieved.

Below, the optical fiber of the present invention is explained in detail using examples and comparative examples. However, this invention is not limited by the examples presented below.

EXAMPLES 1~12 and COMPARATIVE EXAMPLES 1~12

Optical fibers are manufactured as examples 1~12 and comparative examples 1~12. Table 1 shows structure types and structure parameters such as $\Delta_1$, $\Delta_2$, $2b/2a$, $2a$, $d_1$, $d_2$, $z_1/a$, $z_2$, $z_3$ and $2c$ of the optical fibers which relate to examples 1~12 and comparative examples 1~12. In structure column, "12" means 12-hole structure, and "18" means 18-hole structure.

Examples 1 and 2, examples 3 and 4, examples 5 and 6, examples 7 and 8, examples 9 and 10, examples 11 and 12, comparative examples 1 and 2, comparative examples 3 and 4, comparative examples 5 and 6, comparative examples 7 and 8, comparative examples 9 and 10, and comparative examples 11 and 12 are pair of fibers, respectively. Each pair of fibers is obtained from the same optical fiber preform, divided into half and 12 holes are drilled in one optical fiber preform and 18 holes are drilled in the other optical fiber preform. In examples 7 and 8, F-doped silica glass is used as cladding 13; and in others, pure silica glass is used as cladding. Drawing conditions are the same for all preforms.

Table 2 shows cut-off wavelength $\lambda_c$, bending loss at a bending diameter of 20 mm at 1550 nm, and effective core area $A_{eff}$ at 1550 nm measured for optical fibers relate to examples 1~12 and comparative examples 1~12.

TABLE 1

| Units | Structure — | $\Delta_1$ % | $\Delta_2$ % | $2b/2a$ — | $2a$ μm | $d_1$ μm | $d_2$ μm | $z_1/a$ — | $z_2$ μm | $z_3$ μm | $2c$ μm |
|---|---|---|---|---|---|---|---|---|---|---|---|
| Example 1 | 12 | 0.09 | −0.11 | 4.2 | 13.9 | 12.5 | 12.6 | 3.8 | — | 45.7 | 125 |
| Example 2 | 18 | 0.09 | −0.11 | 4.2 | 13.9 | 12.5 | 12.6 | 3.8 | 52.8 | — | 126 |
| Example 3 | 12 | 0.1 | −0.1 | 4 | 14.8 | 12.3 | 12.3 | 3.2 | — | 41 | 125 |
| Example 4 | 18 | 0.1 | −0.1 | 4 | 14.8 | 12.3 | 12.3 | 3.2 | 47.4 | — | 125 |
| Example 5 | 12 | 0.1 | −0.08 | 4.2 | 16.4 | 11.5 | 11.5 | 4.2 | — | 59.7 | 125 |
| Example 6 | 18 | 0.1 | −0.08 | 4.2 | 16.4 | 11.5 | 11.5 | 4.2 | 68.9 | — | 126 |
| Example 7 | 12 | 0.11 | −0.09 | 3.5 | 15.1 | 12.8 | 12.8 | 3.4 | — | 44.5 | 125 |
| Example 8 | 18 | 0.11 | −0.09 | 3.5 | 15.1 | 12.8 | 12.8 | 3.4 | 51.3 | — | 125 |
| Example 9 | 12 | 0.1 | −0.11 | 4.2 | 14.7 | 13.1 | 17.8 | 3.5 | — | 53.5 | 126 |

TABLE 1-continued

| Units | Structure — | Δ1 % | Δ2 % | 2b/2a — | 2a μm | d1 μm | d2 μm | z1/a — | z2 μm | z3 μm | 2c μm |
|---|---|---|---|---|---|---|---|---|---|---|---|
| Example 10 | 18 | 0.1 | −0.11 | 4.2 | 14.7 | 13.1 | 17.8 | 3.5 | 61.7 | — | 126 |
| Example 11 | 12 | 0.1 | −0.1 | 3.5 | 14.9 | 12.8 | 10 | 3.5 | — | 36.1 | 125 |
| Example 12 | 18 | 0.1 | −0.1 | 3.5 | 14.9 | 12.8 | 10 | 3.5 | 41.7 | — | 125 |
| Comparative example 1 | 12 | 0.05 | −0.14 | 3.2 | 18.9 | 9 | 9 | 3.1 | — | 50.7 | 125 |
| Comparative example 2 | 18 | 0.05 | −0.14 | 3.2 | 18.8 | 9 | 9 | 3.1 | 58.3 | — | 125 |
| Comparative example 3 | 12 | 0.12 | −0.03 | 4.1 | 10.9 | 10.5 | 10.5 | 3.5 | — | 33 | 124 |
| Comparative example 4 | 18 | 0.12 | −0.03 | 4.1 | 10.9 | 10.5 | 10.5 | 3.5 | 38.2 | — | 125 |
| Comparative example 5 | 12 | 0.11 | −0.15 | 5.1 | 14.7 | 11.3 | 11.3 | 5.1 | — | 64.9 | 125 |
| Comparative example 6 | 18 | 0.11 | −0.15 | 5.1 | 14.7 | 11.3 | 11.3 | 5.1 | 75 | — | 125 |
| Comparative example 7 | 12 | 0.09 | −0.09 | 1.9 | 14.3 | 11.1 | 11.1 | 1.9 | — | 23.5 | 126 |
| Comparative example 8 | 18 | 0.09 | −0.09 | 1.9 | 14.4 | 11.1 | 11.1 | 1.9 | 27.4 | — | 125 |
| Comparative example 9 | 12 | 0.1 | −0.13 | 3.5 | 15.2 | 15.5 | 15.5 | 3.8 | — | 50.0 | 124 |
| Comparative example 10 | 18 | 0.1 | −0.13 | 3.5 | 15.2 | 15.5 | 15.5 | 3.8 | 57.8 | — | 125 |
| Comparative example 11 | 12 | 0.13 | −0.1 | 3.6 | 16.3 | 6.8 | 6.8 | 3.6 | — | 50.8 | 125 |
| Comparative example 12 | 18 | 0.13 | −0.1 | 3.6 | 16.3 | 6.8 | 6.8 | 3.6 | 58.7 | — | 125 |

TABLE 2

| | λc | Bend loss | A eff | Dispersion Wavelength | Transmission loss |
|---|---|---|---|---|---|
| | | 1550 nm | 1550 nm | 1550 nm | 1550 nm |
| Units | nm | dB/m | μm² | Ps/nm/km | dB/km |
| Example 1 | 1409 | 0.625 | 177 | 20.18 | 0.21 |
| Example 2 | 1412 | 0.038 | 176 | 20.22 | 0.208 |
| Example 3 | 1478 | 0.542 | 188 | 20.01 | 0.203 |
| Example 4 | 1462 | 0.01 | 188 | 20.05 | 0.205 |
| Example 5 | 1408 | 9.533 | 200 | 19.93 | 0.197 |
| Example 6 | 1415 | 0.128 | 199 | 19.9 | 0.2 |
| Example 7 | 1480 | 0.461 | 184 | 20.14 | 0.178 |
| Example 8 | 1465 | 0.015 | 184 | 20.21 | 0.179 |
| Example 9 | 1498 | 0.351 | 186 | 21.28 | 0.204 |
| Example 10 | 1491 | 0.008 | 186 | 20.99 | 0.208 |
| Example 11 | 1488 | 0.628 | 188 | 21.17 | 0.203 |
| Example 12 | 1481 | 0.021 | 188 | 21.15 | 0.205 |
| Comparative example 1 | 1374 | 183.9 | 198 | 19.94 | 0.202 |
| Comparative example 2 | 1381 | 20.9 | 197 | 19.89 | 0.198 |
| Comparative example 3 | 1393 | 3.206 | 174 | 21.56 | 0.195 |
| Comparative example 4 | 1401 | 0.58 | 174 | 21.4 | 0.195 |
| Comparative example 5 | 1320 | 156.7 | 183 | 21.32 | 0.21 |
| Comparative example 6 | 1311 | 18.7 | 182 | 21.31 | 0.205 |
| Comparative example 7 | 1738 | 0.052 | 170 | 20.84 | 0.205 |
| Comparative example 8 | 1751 | ≤0.001 | 170 | 20.66 | 0.206 |
| Comparative example 9 | ≥2000 | 0.005 | 183 | 20.49 | 0.209 |
| Comparative example 10 | ≥2000 | ≤0.001 | 183 | 20.58 | 0.21 |
| Comparative example 11 | 1301 | 140 | 191 | 21.04 | 0.207 |
| Comparative example 12 | 1313 | 14.8 | 191 | 20.91 | 0.204 |

As shown in Table 2, optical fibers in examples 1~10 have $A_{\mathit{eff}} \geq 175$ μm²; cut-off wavelength ≤1550 nm; and a bending loss ≤10 dB/m. Especially, optical fibers with the 18-holes structure have 1/10 of the bending loss compared to optical fibers with the 12-hole structure. Also, because optical fibers of examples 3 and 4 have 2a of 16 μm or larger, the bending losses are slightly larger than the optical fibers of examples 1 and 2; however, $A_{\mathit{eff}}$ are kept at approximately 200 μm². Furthermore, because F-doped silica glass is used as cladding 13 in optical fibers of examples 5 and 6, the transmission loss is smaller than other fibers and is ≤0.180 dB/km.

On the other hand, because optical fibers of comparative examples 1 and 2 have small $\Delta A_1$, the bending loss exceeded 10 dB/m. Also, because optical fibers of comparative examples 3 and 4 have large $\Delta_2$, the $A_{\mathit{eff}}$ is smaller than 175 βm² at 1550 nm. Because optical fibers of comparative examples 5 and 6 have large 2b/2a, the bending loss exceeds 10 dB/m. Also, because optical fibers of comparative examples 7 and 8 have small 2b/2a, the $A_{\mathit{eff}}$ is smaller than 175 μm² at 1550 nm and the cut-off wavelength also exceeds 1550 nm. Because optical fibers of comparative examples 9 and 10 have large diameters $d_1$ and $d_2$ for the secondary medium portions, the cut-off wavelength is longer than 2000 nm and, therefore, single-mode operation is impossible at 1550 nm. Also, because optical fibers of comparative examples 11 and 12 have small diameters $d_1$ and $d_2$ for the secondary medium portions, the bending loss exceeds 10 dB/m.

In the above embodiments, within the same secondary medium portions such as all of the first secondary medium portions, the same diameters are used for each portion; however, different diameters can be used in combination and, for example, large-diameter portions and small-diameter portions in the same secondary medium portions can be placed alternatively. However, secondary medium portions with a combination of different diameters make preform manufacturing process complex and increases the cost. Also, generally pressurization of the holes for creating secondary medium portions during optical fiber drawing is needed to prevent collapse of the holes. If the holes have the same diameter, pressurization of each hole can be done at the same pressure level; however, if holes have different diameters, pressure at each hole needs to be controlled. It therefore becomes difficult to control and manufacturing cost also increases because of the complexity in controlling devices. Therefore, it is preferable to have the same diameter for all of the secondary medium portions.

As for the method to create holes in the preform, other than drilling method, the stack-and-draw method is used often. The drilling method uses an ultrasonic drill to create holes in the preform; and the stack-and-draw method bundles hollow pipes around the core, inserts the bundle in a jacket tube, fills in the gaps with a solid core rod for example made by silica, and draws the jacket tube with the bundle and the solid core rod. In the stack-and-draw method, the diameters of holes and distances between the centers of the holes are adjusted by varying inner diameters and outer diameters of hollow pipes inserted in the jacket tube, respectively. In the stack-and-draw method, if the diameters of the secondary medium portions are the same and distances between the center of the secondary medium portions and the adjacent secondary medium portions for all of the secondary medium portions are the same, then fewer kinds of pipes need to be used, which makes manufacturing easier.

What is claimed is:

1. An optical fiber comprising:
a glass optical fiber, made from silica glass, comprising:
a core including a first core located at a center of the optical fiber and a second core surrounding the first core; and
a cladding around the core; and
a coating, made from a resin, that coats the glass optical fiber, wherein the first core has a refractive index higher than that of the cladding,
the second core has a refractive index lower than that of the cladding,
the optical fiber has an effective core area $\geq 175$ μm$^2$ at a wavelength of 1550 nm, a bending loss $\leq 10$ dB/m at a bending diameter of 20 mm at the wavelength of 1550 nm, and a cut-off wavelength $\lambda_c \leq 1550$ nm,
the glass optical fiber comprises a primary medium portion and secondary medium portions having a refractive index lower than that of the primary medium portion,
the secondary medium portions have a plurality of first secondary medium portions around the first core and a plurality of second secondary medium portions around the first core and outside of the first secondary medium portions
a relative refractive index difference $\Delta_1$ of the first core with respect to the cladding is 0.06~0.14%, a relative refractive index difference $\Delta_2$ of the second core with respect to the cladding is −0.20~−0.05%, and a ratio $2b/2a=3.0$~4.5, where $2a$ is the diameter of the first core and $2b$ is the outer diameter of the second core,
six of the first secondary medium portions are positioned such that they create a six-fold rotational symmetry with respect to the first core and a ratio $z_1/a$ is 3.0~4.5, wherein $z_1$ is the distance between a center of the first core and a center of the first secondary medium portion and $2a$ is the diameter of the first core, and
the second secondary medium portions are positioned outside of the first secondary medium portions such that they create a six-fold rotational symmetry with respect to the first core, six of the second secondary medium portions being positioned on apexes of a hexagon where the apexes are positioned on extension lines of a center of the first core and centers of the first secondary medium portions, other six of the second secondary medium portions being positioned on midpoints of sides of the hexagon.

2. The optical fiber of claim 1, wherein cross-sectional areas of the first and second secondary medium portions are circular and have approximately the same diameter.

3. The optical fiber of claim 1, wherein the an outer diameter, $2c$, of the glass optical fiber is 120~130 μm.

4. An optical fiber comprising:
a glass optical fiber, made from silica glass, comprising:
a core including a first core located at the center of the optical fiber and a second core surrounding the first core; and
a cladding around the core; and
a coating, made from a resin, that coats the glass optical fiber, wherein the first core has a refractive index higher than that of the cladding,
the second core has a refractive index lower than that of the cladding,
the optical fiber has an effective core area $\geq 175$ μm$^2$ at a wavelength of 1550 nm, a bending loss <10 dB/m at a bending diameter of 20 mm at the wavelength of 1550 nm, and a cut-off wavelength $\lambda_c \leq 1550$ nm,
the glass optical fiber comprises a primary medium portion and secondary medium portions having a refractive index lower than that of the primary medium portion,
the secondary medium portions have a plurality of first secondary medium portions around the first core and a plurality of second secondary medium portions around the first core and outside of the first secondary medium portions,
a relative refractive index difference $\Delta_1$ of the first core with respect to the cladding is 0.06~0.14%, a relative refractive index difference $\Delta_2$ of the second core with respect to the cladding is −0.20~−0.05%, and a ratio $2b/2a=3.0$~4.5, where $2a$ is the diameter of the first core and $2b$ is the outer diameter of the second core,
six of the first secondary medium portions are positioned such that they create a six-fold rotational symmetry with respect to the first core and a ratio $z_1/a$ is 3.0~4.5, wherein $z_1$ is the distance between a center of the first core and a center of the first secondary medium portion and $2a$ is the diameter of the first core, and
the second secondary medium portions are positioned outside of the first secondary medium portions such that they create a six-fold rotational symmetry with respect to the first core, midpoints of the adjacent second secondary medium portions being positioned on extension lines of a center of the first core and centers of the first secondary medium portions.

5. The optical fiber of claim 4, wherein cross-sectional areas of the first and second secondary medium portions are circular and have approximately the same diameter.

6. The optical fiber of claim 4, wherein an outer diameter, $2c$, of the glass optical fiber is 120~130 μm.

* * * * *